Patented Feb. 24, 1953

2,629,752

UNITED STATES PATENT OFFICE 2,629,752

PREPARATION AND PURIFICATION OF 1-PHENYLBUTADIENE-1,3

Louis E. Craig, Washington, N. J., and Clifford E. Larrabee, Easton, Pa., assignors to General Aniline & Film Corporation, New York, N. Y., a corporation of Delaware No Drawing. Application December 27, 1951, Serial No. 263,711

2 Claims. (Cl. 260—674)

This invention relates to the preparation and purification of 1-phenylbutadiene-1,3 by the cyclic polymerization of acetylene to produce a yellow-colored $C_{10}H_{10}$ fraction, extracting the fraction with an aqueous solution of a silver salt such as the nitrate to produce a colorless raffinate, and distilling from the latter pure 1-phenylbutadiene-1,3.

The polymerization of acetylene to produce a $C_{10}H_{10}$ fraction is known. In a typical method acetylene is reacted at 90 to 100° C. in a 5-liter autoclave containing 1800 cc. of tetrahydrofuran (perfectly dry), 100 grams of ethylene oxide and 30 grams of nickel cyanide (anhydrous), under 15 to 20 atoms pressure, 5 of which are nitrogen. The catalyst and cuprene are separated by filtration; solvent and cyclooctatetraene are distilled off leaving a blue-green fraction boiling between 42 and 60° C. at 2 mm. Traces of glycol and diglycol are removed by water-washing and drying. In order to remove the azulene, which is the cause of the blue-green color, the distillate is mixed with petroleum ether and shaken with 80% phosphoric acid. The petroleum ether is washed neutral, dried with sodium sulfate, the solvent distilled off, and the residue then fractionated. To remove minor quantities of oxygenated compounds, the hydrocarbon (B. P. 43 to 50° C. at 2 mm.) is dissolved in low-boiling petroleum ether, contacted with aluminum oxide, freed from solvent and the residue vacuum-distilled.

A yellow colored fraction is then obtained, having a boiling point of about 47 to 50° C. at 2 mm. and an average formula $C_{10}H_{10}$. This fraction has been regarded as cyclodecapentaene.

It has been found in accordance with the invention that an aqueous solution of a silver salt selectively extracts the yellow component from this fraction producing a colorless raffinate, and by distillation of this raffinate pure 1-phenylbutadiene-1,3 is obtained.

The objects achieved in accordance with the invention as described herein include the provision of a process for the selective extraction of the yellow component from the $C_{10}H_{10}$ material obtained by the cyclic polymerization of acetylene, and recovering from the resulting raffinate pure 1-phenylbutadiene-1,3; and other objects which will become apparent as details or embodiments of the invention are set forth hereinafter.

In order to facilitate a clear understanding of the invention, the following preferred embodiment is described in detail:

A solution of 50 parts (by weight) of the $C_{10}H_{10}$ fraction [B. P. 70–75° C. (10 mm.), $n_D^{25}$ 1.569–1.578] in 100 parts of low boiling petroleum ether was shaken vigorously with successive 50 part portions of 30% aqueous silver nitrate until all yellow color had been removed. The petroleum ether layer was separated and dried over anhydrous sodium sulfate. The petroleum ether was removed and the residue distilled, giving 12 parts of colorless cis 1-phenylbutadiene-1,3, B. P. 87–89° C. (20 mm.). Careful refractionation through an efficient column gave very pure cis 1-phenylbutadiene-1,3, B. P. 87.7° C. (20 mm.), $n_D^{25}$ 1.5808. Elementary analyses gave the following results:

$C_{10}H_{10}$:
 Calculated—C, 92.26%; H, 7.74%
 Found—C, 92.25%; H, 7.82%

The structure of the product was established as 1-phenylbutadiene-1,3 by hydrogenation to the known butylbenzene with absorption of two molar equivalents of hydrogen, and also by preparation of two known bromine addition products of 1-phenylbutadiene-1,3. Comparison of the product with an authentic sample of trans 1-phenylbutadiene-1,3 showed it to have different ultraviolet and infrared absorption spectra and different chemical properties. Upon irradiation with ultraviolet light, the product became identical with the sample having the trans configuration, showing that it had the cis configuration and was converted to the trans by ultraviolet light.

In the polymerization of the acetylene, there may be included a small amount of an antioxidant such as an organic or inorganic compound having reducing properties, e. g. hydroquinone, diphenyl amine, dimethyl sulfite, sodium sulfite, sodium iodide, and the like. Although nickel cyanide is preferred as the catalyst in the polymerization, other nickel compounds may be used, such as the chloride, sulfate, hydroxide, carbonate, formate, or acetoacetic ester enolate. Generally the amount of the catalyst is 1 to 5% by weight of the solvent tetrahydrofuran, and the amount of the antioxidant is in the range of 0.05 to 1%. The temperature may be in the range of 60 to 140° C., preferably 90 to 100° C. for the production of $C_{10}H_{10}$; and the pressure may be in the range of 10 to 25 atmospheres or higher.

The product 1-phenylbutadiene-1,3 prepared in accordance with the invention is useful as an intermediate for the preparation of copolymers, e. g. with styrene, which are useful as coating materials, and the like. Also, it forms an addend with maleic anhydride, which gives 3-phenylphthalic anhydride upon dehydrogenation; and this reacts with polyhydric materials such as glycerol to give useful plastics, coating materials and the like.

Variations and modifications of the invention will be apparent to one skilled in the art in view of the foregoing disclosures, and it is intended to include within the invention all such modifications and variations except as do not come within the scope of the appended claims.

We claim:

1. In the process of catalytically cyclopolymerizing acetylene and separating a yellow-colored $C_{10}H_{10}$ material, the improvement which comprises extracting the yellow component from said material with aqueous silver nitrate, and distilling from the resulting raffinate 1-phenylbutadiene-1,3.

2. The method of claim 1 wherein the temperature of the acetylene cyclopolymerizing step is in the range of 90 to 100° C. and the $C_{10}H_{10}$ material is dissolved in low boiling petroleum ether.

LOUIS E. CRAIG.
CLIFFORD E. LARRABEE.

No references cited.